(12) United States Patent
Kim et al.

(10) Patent No.: US 11,093,734 B2
(45) Date of Patent: Aug. 17, 2021

(54) METHOD AND APPARATUS WITH EMOTION RECOGNITION

(71) Applicant: Samsung Electronics Co., Ltd., Suwon-si (KR)

(72) Inventors: Youngsung Kim, Suwon-si (KR); Youngjun Kwak, Seoul (KR); Byung In Yoo, Seoul (KR); Seohyung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 16/182,861

(22) Filed: Nov. 7, 2018

(65) Prior Publication Data

US 2019/0213400 A1 Jul. 11, 2019

(30) Foreign Application Priority Data

Jan. 5, 2018 (KR) .................. 10-2018-0001456

(51) Int. Cl.
*G06K 9/00* (2006.01)
*G06K 9/62* (2006.01)
(Continued)

(52) U.S. Cl.
CPC ..... *G06K 9/00315* (2013.01); *G06K 9/00335* (2013.01); *G06K 9/00597* (2013.01);
(Continued)

(58) Field of Classification Search
CPC ........... G06K 9/00302; G06K 9/00281; G06K 9/00315; G06K 9/00335; G06K 9/6267;
(Continued)

(56) References Cited

U.S. PATENT DOCUMENTS 9,781,392 B2 10/2017 Sahay et al.
2014/0022370 A1* 1/2014 Sohn .................. G06K 9/00315
348/78

(Continued)

FOREIGN PATENT DOCUMENTS

JP 5624100 B2 11/2014
KR 10-2013-0117624 A 10/2013

(Continued)

OTHER PUBLICATIONS

Jung, Heechul, et al., "Joint-Tuning in Deep Neural Networks for Facial Expression Recognition", *2015 IEEE International Conference on Computer Vision (ICCV)*, 2015 (pp. 2983-2991).

(Continued)

*Primary Examiner* — Ajibola A Akinyemi
(74) *Attorney, Agent, or Firm* — NSIP Law

(57) ABSTRACT

A method and apparatus with emotion recognition acquires a plurality of pieces of data corresponding a plurality of inputs for each modality and corresponding to a plurality of modalities; determines a dynamics representation vector corresponding to each of the plurality of modalities based on a plurality of features for each modality extracted from the plurality of pieces of data; determines a fused representation vector based on the plurality of dynamics representation vectors corresponding to the plurality of modalities; and recognizes an emotion of a user based on the fused representation vector.

32 Claims, 12 Drawing Sheets

(51) Int. Cl.
*G10L 15/02* (2006.01)
*G10L 15/06* (2013.01)

(52) U.S. Cl.
CPC ......... *G06K 9/6262* (2013.01); *G06K 9/6274* (2013.01); *G10L 15/02* (2013.01); *G10L 15/063* (2013.01)

(58) Field of Classification Search
CPC ........... G06K 9/00228; G06K 9/00268; G06K 9/00308; G06K 9/00684; G06K 9/00711; G06K 9/46; G06K 9/4604; G06K 9/4671; G06K 9/52; G06K 9/6256; G06K 9/6269
USPC ........................................................ 382/157
See application file for complete search history.

(56) References Cited

U.S. PATENT DOCUMENTS

| | | | |
|---|---|---|---|
| 2014/0112556 A1* | 4/2014 | Kalinli-Akbacak | G06K 9/00302 382/128 |
| 2016/0217319 A1* | 7/2016 | Bhanu | G06K 9/00281 |
| 2016/0350801 A1 | 12/2016 | Vincent et al. | |
| 2017/0132512 A1* | 5/2017 | Ioffe | G06N 3/08 |
| 2017/0220854 A1* | 8/2017 | Yang | G06K 9/522 |
| 2018/0366121 A1* | 12/2018 | Funazukuri | A61B 5/165 |

FOREIGN PATENT DOCUMENTS

| | | |
|---|---|---|
| KR | 10-1480669 B1 | 1/2015 |
| KR | 10-2015-0086770 A | 7/2015 |
| KR | 10-2016-0095735 A | 8/2016 |
| KR | 10-2017-0094836 A | 8/2017 |

OTHER PUBLICATIONS

Khorrami, Pooya, et al., "Do Deep Neural Networks Learn Facial Action Units When Doing Expression Recognition?", *2015 IEEE International Conference on Computer Vision Workshop (ICCVW)*, 2015 (pp. 19-27).

Kuppens, Peter et al., "Looking at Emotion Regulation Through the Window of Emotion Dynamics", *Psychological Inquiry*, vol. 26, Issue 1, 2015 (pp. 72-79).

Benitez-Quiroz, C. Fabian et al., "EmotioNet: An accurate, real-time algorithm for the automatic annotation of a million facial expressions in the wild", *2016 IEEE Conference on Computer Vision and Pattern Recognition (CVPR)*, 2016 (pp. 5562-5570).

Presti, Liliana Lo, et al., "Boosting Hankel matrices for face emotion recognition and pain detection." *Computer Vision and Image Understanding*, vol. 156, Mar. 2017, (pp. 19-33).

* cited by examiner

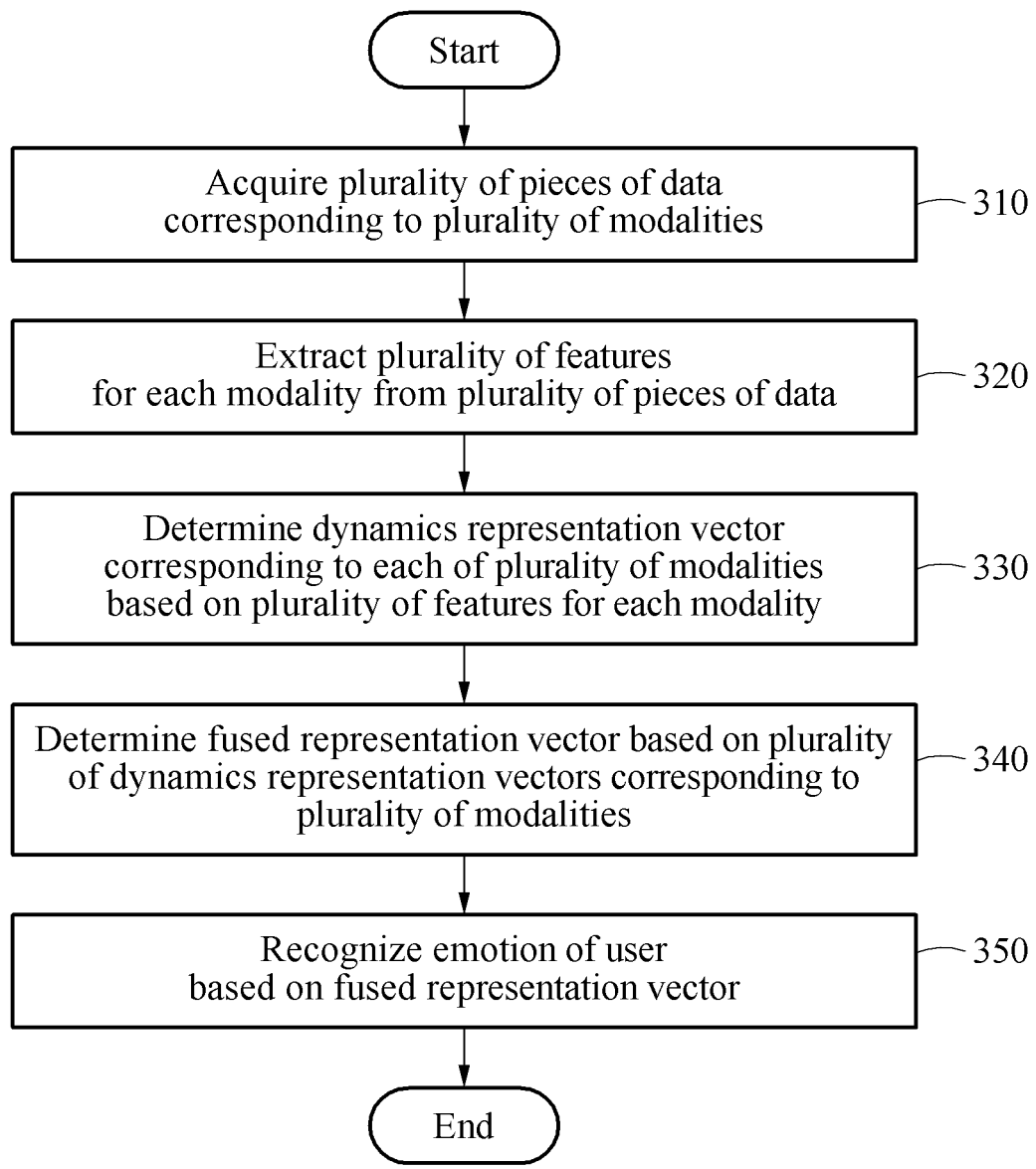

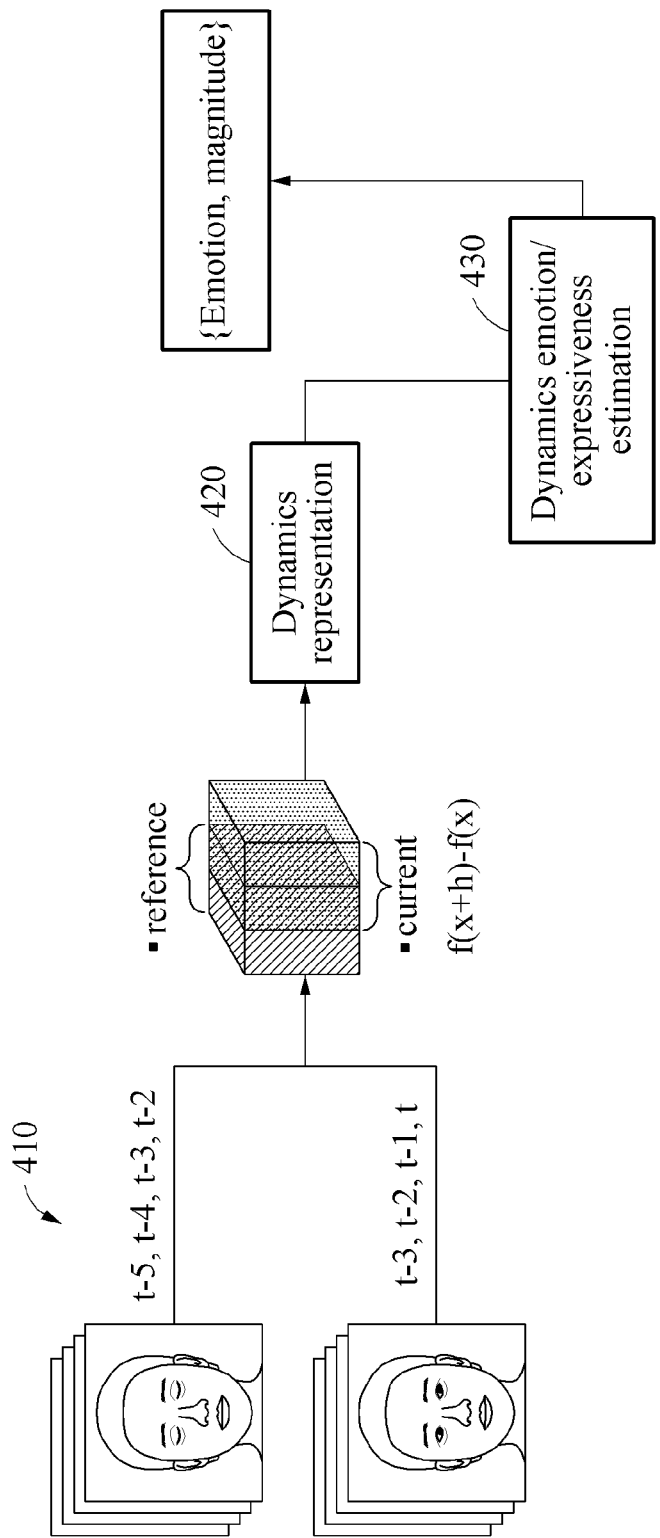

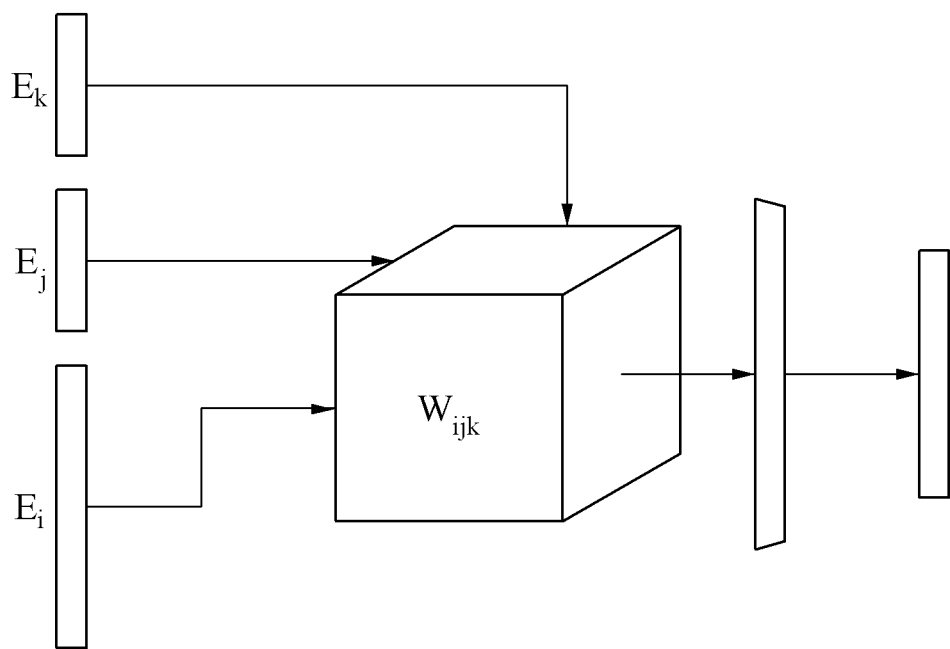

- $E_i = (1-\alpha_i) \dfrac{1}{\Sigma_j |W_{ij}| + \Sigma_k |W_{ik}| + \Sigma_{jk} W_{jk}} (\Sigma_{jk} W_{jk} E_j E_k + \Sigma_j W_{ij} E_j + \Sigma_k W_{ik} E_k) + \alpha_i E_i$

- $E_j = (1-\alpha_j) \dfrac{1}{\Sigma_i |W_{ij}| + \Sigma_k |W_{jk}| + \Sigma_{ik} W_{ik}} (\Sigma_{ik} W_{ik} E_i E_k + \Sigma_i W_{ij} E_i + \Sigma_k W_{jk} E_k) + \alpha_j E_j$

- $E_k = (1-\alpha_k) \dfrac{1}{\Sigma_i |W_{ik}| + \Sigma_j |W_{jk}| + \Sigma_{ij} W_{ij}} (\Sigma_{ij} W_{ij} E_i E_j + \Sigma_i W_{ik} E_i + \Sigma_j W_{jk} E_j) + \alpha_k E_k$ ly of pieces of data may include a first input corresponding to a first time duration and a second input corresponding to a second time duration, and the determining of the dynamics representation vector may include determining the dynamics representation vector corresponding to each of the plurality of modalities by applying features corresponding to the first input and the second input to a second neural network.

METHOD AND APPARATUS WITH EMOTION RECOGNITION

CROSS-REFERENCE TO RELATED APPLICATIONS

This application claims the benefit under 35 USC § 119(a) of Korean Patent Application No. 10-2018-0001456 filed on Jan. 5, 2018 in the Korean Intellectual Property Office, the entire disclosure of which is incorporated herein by reference for all purposes.

BACKGROUND

1. Field

The following description relates to a method and apparatus with emotion recognition.

2. Description of Related Art

An emotion may be expressed by one or more emotion expression elements, for example, a facial expression, a gesture, a voice, and the like. Emotions expressed by a person may change frequently. In addition, emotions expressed by people witnessing the same event may be different and may occur at a different point in time. Accordingly, hardware implementations that are configured to recognize expressions fail or are inaccurate when configured to recognize expressions using independent considerations, i.e., there are some constraints in precisely verifying the emotion of a user using only a single emotion expression element or modality.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an emotion recognition method includes acquiring a plurality of pieces of data corresponding to a plurality of modalities, the plurality of pieces of data including a plurality of inputs for each modality; extracting a plurality of features for each modality from the plurality of pieces of data; determining a dynamics representation vector corresponding to each of the plurality of modalities based on the plurality of features for each modality; determining a fused representation vector based on the plurality of dynamics representation vectors corresponding to the plurality of modalities; and recognizing the emotion of a user based on the fused representation vector.

The acquiring may include acquiring a first input corresponding to a first time duration and a second input corresponding to a second time duration for each modality.

The first time duration and the second time duration may partially overlap or be continuous.

The extracting may include the plurality of features for each modality from the plurality of pieces of data using a respective one of first neural networks each including layers trained for a respective modality.

Each of the first neural networks may include layers in which different emotions corresponding to each modality and different expression intensities corresponding to the different motions are trained.

The plurality of pieces of data may include a first input corresponding to a first time duration and a second input corresponding to a second time duration, and the determining of the dynamics representation vector may include determining the dynamics representation vector corresponding to each of the plurality of modalities by applying features corresponding to the first input and the second input to a second neural network.

The determining of the fused representation vector may include determining the fused representation vector by fusing the plurality of dynamics representation vectors.

The determining of the fused representation vector may include fusing the plurality of dynamics representation vectors using a third neural network including shared parameters associated with the plurality of dynamics representation vectors.

The shared parameters may be changed in response to a change in each of the plurality of dynamics representation vectors.

The recognizing may include estimating the emotion of the user by applying the fused representation vector to a first classifier configured to classify different emotions; and estimating an expression intensity of the motion of the user by applying the fused representation vector to a second classifier configured to classify different expression intensities corresponding to the different emotions.

The plurality of modalities may include any one or any combination of any two or more of a facial expression, a gesture, a voice, and a gaze.

In another general aspect, a training method for emotion recognition includes inputting a plurality of pieces of training data corresponding to a plurality of modalities to a neural network for recognizing an emotion of a user; determining at least one loss based on an output of the neural network and labels of the training data; and training the neural network based on the at least one loss. The neural network includes a plurality of neural network portions configured to determine a plurality of dynamics representation vectors corresponding to the plurality of modalities; and a fused neural network configured to determine a fused representation vector based on the plurality of dynamics representation vectors.

The determining of the at least one loss may include extracting a plurality of features for each modality from the plurality of pieces of training data; determining a first loss for a dynamics representation vector corresponding to each of the plurality of modalities based on the features extracted from the plurality of pieces of training data and features extracted from a plurality of pieces of reference data; determining a second loss for a first classifier configured to estimate the emotions based on respective differences between reference emotions and the emotions estimated from the fused representation vector that are determined based on the plurality of dynamics representation vectors to which the first losses are applied; and determining a third loss for a second classifier configured to estimate an expression intensity of the emotions based on respective differences between expression intensities of the reference emotion and expression intensities of the emotions estimated from the fused representation vector that are determined based on the plurality of dynamics representation vectors to which the first losses are applied.

The determining of the first loss may include determining the first loss for the dynamics representation vector corresponding to each of the plurality of modalities based on a variation between the features extracted from the plurality of pieces of training data and the features extracted from the plurality of pieces of reference data.

Each of the plurality of neural network portions configured to determine the dynamics representation vectors may include layers in which different emotions corresponding to the plurality of modalities and different expression intensities corresponding to the different motions are trained.

The fused neural network that determines the fused representation vector may include shared parameters associated with the dynamics representation vectors, and the shared parameters may be changed in response to a change in each of the plurality of dynamics representation vectors.

The plurality of pieces of data may include a plurality of inputs corresponding to different emotions for each modality and expression emotions of the different emotions.

The plurality of modalities may include any one or any combination of any two or more of a facial expression, a gesture, a voice, and a gaze.

In another general aspect, an apparatus for recognizing an emotion includes a communication interface configured to acquire a plurality of pieces of data corresponding to a plurality of modalities, the plurality of pieces of data including a plurality of inputs for each modality; and a processor configured to extract a plurality of features for each modality from the plurality of pieces of data, to determine a dynamics representation vector corresponding to each of the plurality of modalities based on the plurality of features for each modality, to determine a fused representation vector based on the plurality of dynamics representation vectors corresponding to the plurality of modalities, and to recognize an emotion of a user based on the fused representation vector.

The plurality of pieces of data may include a first input corresponding to a first time duration and a second input corresponding to a second time duration.

The first time duration and the second time duration may partially overlap.

The processor may be further configured to extract the plurality of features for each modality from the plurality of pieces of data using a respective one of first neural networks each comprising layers trained for a respective modality.

The processor may be further configured to determine the dynamics representation vector corresponding to each of the plurality of modalities by applying features corresponding to the first input and the second input to a second neural network.

The processor may be further configured to fuse the plurality of dynamics representation vectors using a third neural network comprising shared parameters associated with the plurality of dynamics representation vectors.

The plurality of modalities may include any one or any combination of any two or more of a facial expression, a gesture, a voice, and a gaze.

In another general aspect, an emotion recognition method includes acquiring data corresponding to different modalities over a duration of time; extracting features for each of the different modalities from the data; determining a dynamics representation vector corresponding to each of the different modalities based respective features for the different modalities; determining a fused representation vector based on the dynamics representation vector for the different modalities; and recognizing the emotion of a user based on the fused representation vector.

A first input may correspond to a first time duration and a second input may correspond to a second time duration for each modality.

The first input may correspond to a reference value, and the second input may correspond to a current time value.

The dynamics representation vector may be based on a difference between a feature vector of the first input corresponding to a previous emotion expression and a feature vector of a second input corresponding to a current emotion expression.

The dynamics representation vector may be based on concatenating the feature vector of the first input and the feature vector of the second input.

Other features and aspects will be apparent from the following detailed description, the drawings, and the claims.

BRIEF DESCRIPTION OF THE DRAWINGS

FIG. 3 is a flowchart illustrating an example of an emotion recognition method.

FIG. 4 illustrates an example of an emotion recognition method based on a plurality of inputs with respect to a single modality.

FIG. 8 illustrates an example of a method of fusing a plurality of dynamics representation vectors in response to three modalities that each have a different number of emotion categories.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
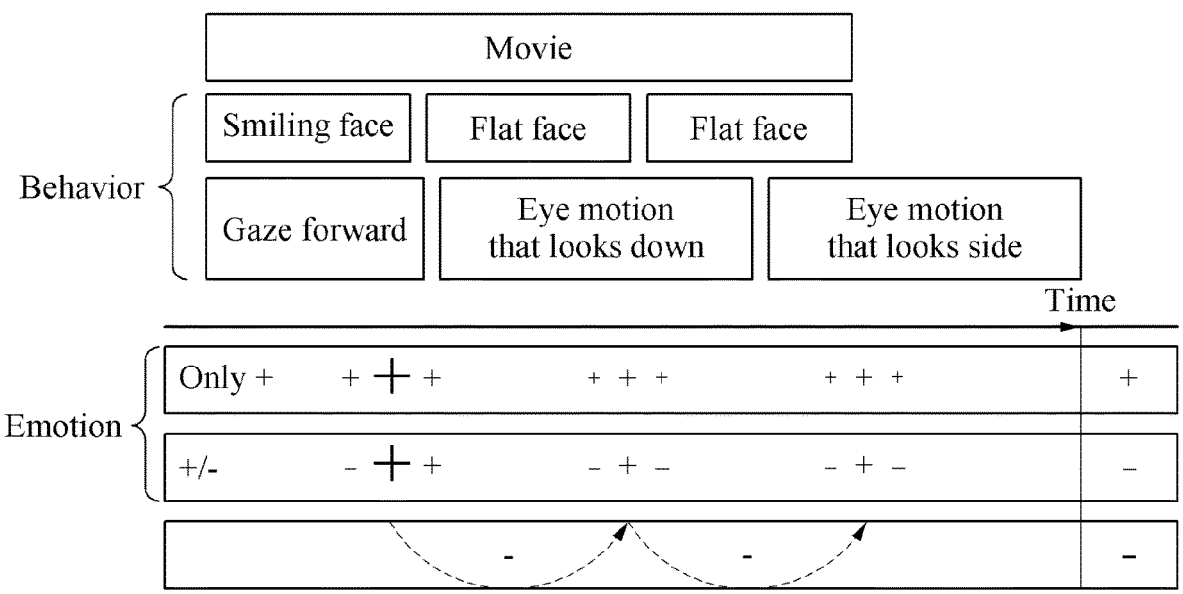
FIGS. 1A and 1B illustrate examples of an emotion recognition method of a user based on a plurality of modalities.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art and in view of the disclosure of this application. Terms defined in dictionaries generally used should be construed to have meanings matching with contextual meanings in the related art and the disclosure of this application and are not to be construed as an ideal or excessively formal meaning unless otherwise defined herein.

Examples set forth hereinafter may be used to recognize an emotion of a user based on a facial expression by or in various devices such as a smartphone and the like. The examples may be used to recognize an expression and/or an emotion of a user by or in a home robot, an intelligent personal assistant robot, an audience measurement, a smartphone, or an augmented reality (AR)/virtual reality (VR) device, for example. The examples may be implemented in a one or more processors, e.g., semiconductor processors, to be included in any one of the above-mentioned devices. Hereinafter, the examples will be described in detail with reference to the accompanying drawings, wherein like drawing reference numerals are used for like elements.

Figure 1B:
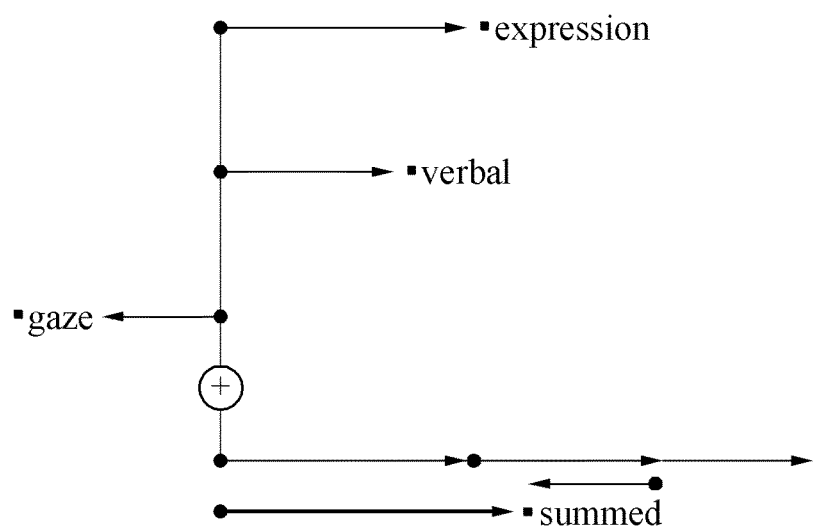

FIGS. 1A and 1B illustrate examples of an emotion recognition method of a user based on a plurality of modalities. FIG. 1A illustrates an example of a process in which the behavior or emotion of a user changes while viewing a movie being played.

For example, if a funny or an emotional scene is played in the movie, the user may gaze forward at the movie and exhibit a smiling face. Here, the emotion of the user may correspond to one of happiness or pleasure. If a boring or annoying scene is shown in the movie, the user may look down or in another direction with a flat face. Here, the emotion of the user may correspond to that of boredom or anger.

As described, the emotion of the user may be recognized through facial expressions, various behaviors and/or uttered words of the user. In addition, various emotions of the user may be expressed as a positive number (+) if the magnitude of an emotion increases, or may be expressed as a negative number (−) if the magnitude of the emotion decreases. Variations of emotions changing over time may appear between a plurality of frames captured from faces or behaviors of the user changing based on contents of the movie being played, as a non-limiting example.

In one example, the emotion of the user may be recognized by collectively using various modalities. The modalities may be various determinable sensory aspects in which human emotions are expressed, and may include, for example, a facial expression, a verbal utterance, an eye movement, a gesture, and the like. Here, a variation of expression for a specific emotion may be present for each modality. The emotion of the user and the magnitude of the emotion may vary over time instead of being fixed to a single emotion or a single magnitude of the emotion.

In one example, it is possible to robustly and accurately recognize nuances of the emotion of the user by appropriately combining comparative and instantaneous variations between the respective modalities.

Referring to FIG. 1B, various modalities, for example, "expression" indicating a facial expression, "verbal" indicating a speech, and "gaze" indicating a gaze of a user, are expressed using directivity, for example, a (+) direction in which a corresponding emotion increase or a (−) direction in which a corresponding emotion decreases. For example, in FIG. 1B for a happiness motion, the "expression" and "verbal" of a user A have respective magnitudes in a right (positive) direction in which the emotion indicating happiness increases, and the "gaze" of the user A has a magnitude in a left (decreasing) direction in which the emotion indicating happiness decreases.

Here, the final emotion of the user A may be determined based on the magnitude of the emotion corresponding to "expression" and "verbal" and the magnitude of the emotion corresponding to "gaze." Accordingly, the final emotion of the user A may be recognized or determined based on a result of summing all of emotions expressed through "expression," "verbal," and "gaze" of the user A.

If the intensity of an emotion is defined in a positive direction only or if magnitudes of the plurality of modalities are simply summed, it may be difficult to accurately recognize the state of the emotion of the user. In one example, directivity of the emotion may be expressed through variations of the emotion occurring in each of the plurality of modalities. Herein, the directivity of an emotion is referred to as "dynamics representation." A final state of the emotion of the user may be expressed by summing or considering a plurality of dynamics representations. Here, the result of summing the plurality of dynamics representations is referred to as "fused representation" or "fused emotion representation."

In one example, performance of multi-modal emotion recognition may be enhanced by defining relationships between modalities based on an emotion, directivity of the emotion, and magnitude of the emotion. Also, in an example, it is possible to provide various types of highly precise services through multi-modal emotion recognition and to enhance the performance of multi-modal emotion recognition, such as in a robot scenario in which a human robot interaction (HRI) is emphasized.

Figure 2A:
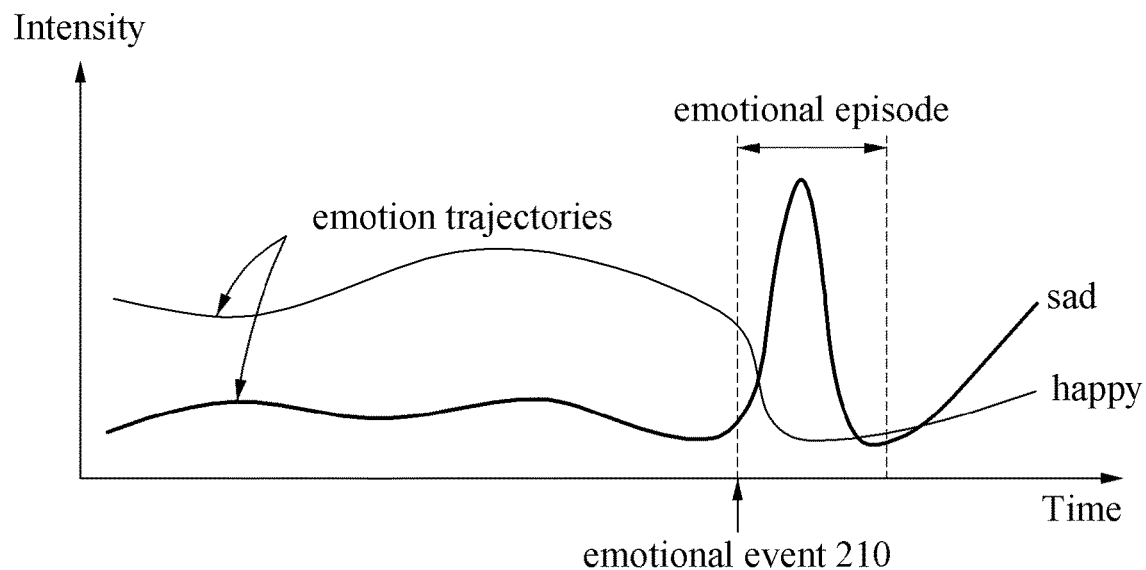
FIGS. 2A and 2B illustrate examples of describing a case in which a reaction for each of plural modalities over an emotion occurring at a different point in time.
Figure 2B:
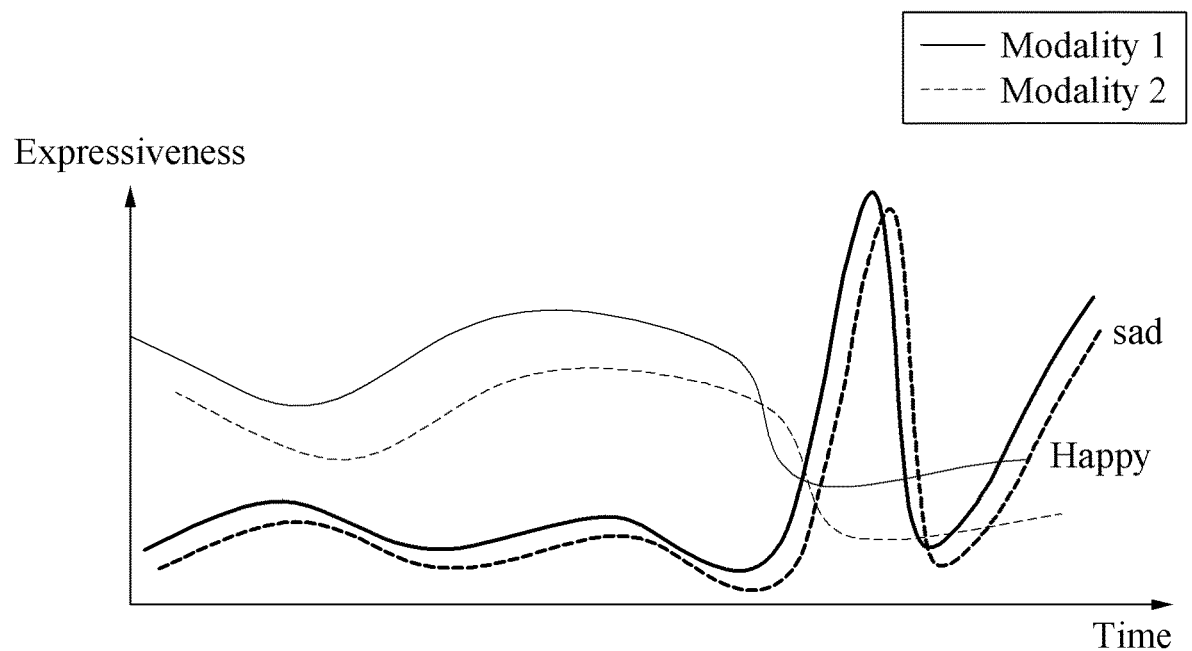

FIGS. 2A and 2B illustrate examples of describing a case in which a reaction for each of plural modalities over an emotion occurring at a different point in time. FIG. 2A illustrates an example of virtual emotion trajectories corresponding to emotions "sad" and "happy" changing over time. In FIG. 2A, the X axis denotes time and the Y axis denotes intensity of the emotion. The intensity of the emotion may also be referred to as a magnitude of the emotion.

Emotional self-regulation or control of an emotion is unique to an individual. Accordingly, the time used to express an emotion for each modality may be different from person to person. Here, emotional self-regulation or control of an emotion refers to a flexible scheme of allowing a socially tolerable voluntary response and corresponds to delaying the voluntary response as necessary. In addition, emotional self-regulation or control of an emotion corresponds to a capability of responding to ongoing demands of experience with a range of emotions.

Referring to FIG. 2A, two emotions, "sad" and "happy," of a user A are expressed. For example, the user A may feel happy before a first point in time 210. The intensity of the emotion "happy" appears to be greater than the intensity of the emotion "sad." A specific emotional event that makes the user A feel sad may occur at the point in time 210. Here, the intensity of the emotion "sad" felt by the user A significantly increases in an emotional episode duration and decreases through self-regulation, and starts to increase slowly after the emotional episode n duration.

FIG. 2B illustrates an example of results in which emotions, "sad" and "happy," are expressed using a plurality of modalities. In FIG. 2B, the X axis denotes time and the Y axis denotes expressiveness of an emotion.

The expressiveness of an emotion corresponds to the intensity used to express a corresponding emotion, that is, an expression intensity of the emotion. In FIG. 2B, a modality 1 indicated with a solid line corresponds to, for example, "expression" of a user and a modality 2 indicated with dotted lines corresponds to, for example, "verbal" of the user.

Referring to FIG. 2B, there is a time difference between when both modalities for emotions occur. For example, the second modality corresponding to the emotion "happy" reacts slightly slowly compared to the first modality corresponding to the emotion "happy." Also, a second modality corresponding to the emotion "sad" reacts slightly slowly compared to a first modality corresponding to the emotion "sad." Here, if the intensity of the first modality and the intensity of the second modality at a specific time are simply summed, the accuracy of emotion recognition may be degraded due to a difference in reaction time between the first modality and the second modality.

In one example, the accuracy of emotion recognition may be enhanced by performing the emotion recognition based on a variation of the first modality and a variation of the second modality at a specific point or duration in time. For example, the accuracy of emotion recognition may be enhanced by considering the gradient of a graph corresponding to the first modality and the gradient of a graph corresponding to the second modality at the specific time. Also, determining or detecting expressiveness accurately may be achieved using variations between modalities.

FIG. 3 is a flowchart illustrating an example of an emotion recognition method. Referring to FIG. 3, in operation 310, an apparatus (hereinafter, also referred to as a recognition apparatus) for recognizing an emotion acquires a plurality of pieces of data corresponding to a plurality of modalities. The plurality of modalities may include, for example, a facial expression, a gesture, a voice, and a gaze; however, these are merely provided as an example only. Various elements capable of expressing an emotion of a person may correspond to the modalities. The recognition apparatus may be, for example, a recognition apparatus 1200 of FIG. 12, as a non-limiting example. The recognition apparatus may also be configured to perform machine learning training, such as discussed below with respect to FIGS. 9 and 10.

The recognition apparatus acquires a plurality of pieces of data using, for example, a partially overlapped time window. The plurality of pieces of data may include a plurality of inputs for each modality. The recognition apparatus acquires, for example, a first input corresponding to a first time duration and a second input corresponding to a second time duration for each modality. The first time duration and the second time duration may partially overlap in time, for example, the first time duration (t, t−1, t−2, t−3) and the second time duration (t−3, t−4, t−5, t−6) overlap at time t−3. Alternatively, the first time duration and the second time duration may be continuous, for example, the first time duration (t, t−1, t−2, t−3) and the second time duration (t−4, t−5, t−6, t−7) are continuous over the duration of t to t−7. The number of first inputs and/or second inputs may be singular or plural.

In operation 320, the recognition apparatus extracts a plurality of features for each modality from the plurality of pieces of data. For example, the recognition apparatus may extract a plurality of features for each modality from a plurality of pieces of data using respective ones of first neural networks each including layers trained for a respective modality. Here, each of the features may correspond to a feature vector expressing an individual modal feature. Each of the first neural networks may include layers for which different emotions corresponding to each modality and different expression intensities (expressiveness) corresponding to the different motions have been trained.

Each of the first neural networks may include shared convolution layers used to extract features from the plurality of pieces of data. Each of the first neural networks may include, for example, first shared convolution layers each having been trained to extract a feature from training data having a different expression intensity with respect to the first modality. Also, each of the first neural networks may include second shared convolution layers respectively having been trained to extract a feature from training data having a different expression intensity with respect to the second modality.

In operation 330, the recognition apparatus determines a dynamics representation vector corresponding to each of the plurality of modalities based on the plurality of features for each modality. The recognition apparatus may determine a dynamics representation vector corresponding to each of the plurality of modalities by applying features corresponding to a first input and a second input to a second neural network. A method of determining, by the recognition apparatus, the dynamics representation vector will be further described with reference to FIG. 4.

In operation 340, the recognition apparatus determines a fused representation vector based on the plurality of dynamics representation vectors corresponding to the plurality of modalities. The recognition apparatus may determine the fused representation vector by fusing the plurality of dynamics representation vectors. The recognition apparatus may fuse the plurality of dynamics representation vectors using, for example, a third neural network including shared parameters associated with the plurality of dynamics representation vectors. Here, the shared parameters may be changed in response to a change in each of the plurality of dynamics representation vectors. A method of determining, by the recognition apparatus, the fused representation vector will be further described with reference to FIG. 5.

In operation 350, the recognition apparatus recognizes an emotion of a user based on the fused representation vector.

For example, the recognition apparatus may estimate an emotion of the user by applying the fused representation vector to a first classifier that classifies different emotions. The recognition apparatus may estimate an expression intensity of the emotion of the user by applying the fused representation vector to a second classifier that classifies different expression intensities corresponding to the different emotions. The recognition apparatus may finally determine the emotion of the user based on the estimated emotion of the user and expression intensity of the emotion. A structure of a neural network implemented by the recognition apparatus to recognize the emotion of the user will be described with reference to FIG. 6.

FIG. 4 illustrates an example of an emotion recognition method based on a plurality of inputs with respect to a single modality. A process of determining a dynamics representation vector based on a plurality of pieces of data with respect to a single modality, for example, a facial expression will be described with reference to FIG. 4.

A recognition apparatus may determine an emotion of a user by comparing a previous emotion expression and a current emotion expression of each modality.

Referring to FIG. 4, in operation 410, the recognition apparatus acquires a first input corresponding to a first time duration (t−5, t−4, t−3, t−2) and a second input corresponding to a second time duration (t−3, t−2, t−1, t). Here, the first input corresponding to the first time duration (t−5, t−4, t−3, t−2) may correspond to a reference value, and the second input corresponding to the second time duration (t−3, t−2, t−1, t) may correspond to a current value used for comparison with the reference value. The first input and the second input may be a single frame or a plurality of frames acquired from input images captured from the facial expression.

The recognition apparatus may extract features associated with the first input and the second input using a neural network that includes layers in which expressions having different expression intensities or different expression variations have been trained. Here, the features may correspond to feature vectors that express features of the facial expression.

In operation 420, the recognition apparatus determines a dynamics representation vector corresponding to each of a plurality of modalities based on a variation between the features of the first input and the second input. For example, the recognition apparatus may determine a dynamics representation vector based on a difference between a feature vector of a first input corresponding to a previous emotion expression and a feature vector of a second input corresponding to a current emotion expression. Alternatively, the recognition apparatus may determine a dynamics representation vector based on a value acquired by concatenating the feature vector of the first input and the feature vector of the second input.

In operation 430, the recognition apparatus estimates an emotion of a user and an expression intensity (expressiveness) of the corresponding emotion based on the dynamics representation vector. Here, the expression intensity of the emotion may correspond to a magnitude of the emotion, and may be expressed as a value between 0 and 1, such as 0.2 or 0.8, as a non-limiting example. The recognition apparatus may estimate an emotion of the user corresponding to the facial expression and an expression intensity of the emotion by applying the dynamics representation vector determined in operation 420 to a classifier trained to classify the emotion of the user and the magnitude of the emotion.

Figure 5:
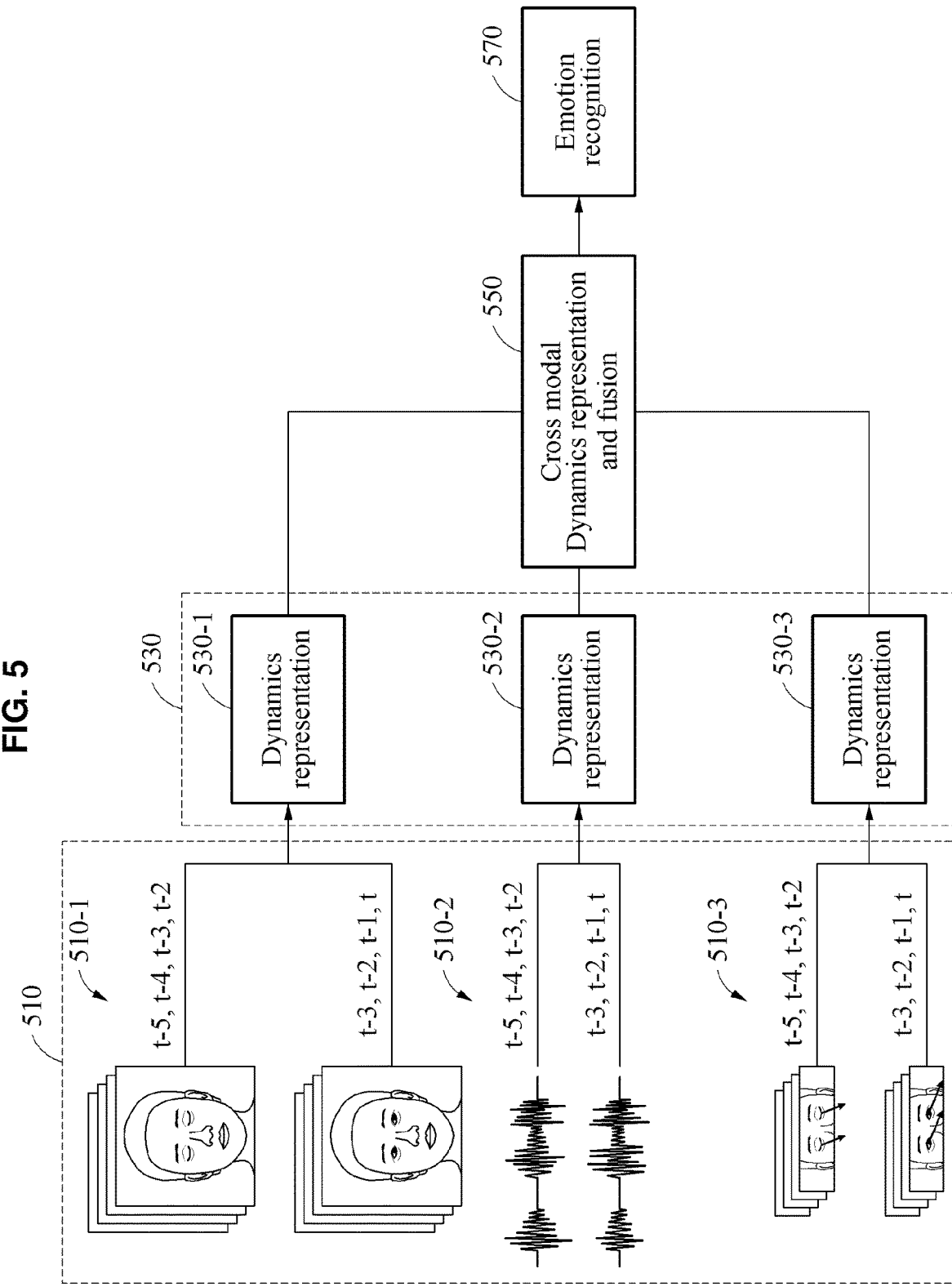
FIG. 5 illustrates an example of an emotion recognition method based on a plurality of inputs with respect to each of a plurality of modalities.

FIG. 5 illustrates an example of an emotion recognition method based on a plurality of inputs with respect to each of a plurality of modalities.

Referring to FIG. 5, in operation 510, the recognition apparatus acquires a plurality of pieces of data corresponding to a plurality of modalities. For example, in operation 510-1, the recognition apparatus acquires a first input of a facial expression "expression" corresponding to a first time duration (t−5, t−4, t−3, t−2) and a second input of the facial expression corresponding to a second time duration (t−3, t−2, t−1, t). In operation 510-2, the recognition apparatus acquires a first input of uttered words "verbal" corresponding to the first time duration (t−5, t−4, t−3, t−2) and a second input of the uttered words corresponding to the second time duration (t−3, t−2, t−1, t). In operation 510-3, the recognition apparatus acquires a first input of a gaze corresponding to the first time duration (t−5, t−4, t−3, t−2) and a second input of the gaze corresponding to the second time duration (t−3, t−2, t−1, t). Here, each of the first time duration and the second time duration may be identical for each modality, though examples are not limited thereto.

In operation 530, the recognition apparatus determines a dynamics representation vector corresponding to each of the plurality of modalities based on a plurality of features for a respective modality extracted from the plurality of pieces of data. In operation 530-1, the recognition apparatus determines a first dynamics representation vector corresponding to the facial expression "expression" by applying, to a second neural network, a variation between features extracted from the first input of the facial expression and the second input of the facial expression. In operation 530-2, the recognition apparatus determines a second dynamics representation vector corresponding to the uttered words "verbal" by applying, to the second neural network, a variation between features extracted from the first input of the uttered words and the second input of the uttered words. In operation 530-3, the recognition apparatus determines a third dynamics representation vector corresponding to the gaze "gaze" by applying, to the second neural network, a variation between features extracted from the first input of the gaze and the second input of the gaze.

In operation 550, the recognition apparatus determines a fused representation vector by fusing the first dynamics representation vector corresponding to the facial expression, the second dynamics representation vector corresponding to the uttered words, and the third dynamics representation vector corresponding to the gaze. The recognition apparatus may fuse the plurality of dynamics representation vectors using a third neural network that includes shared parameters associated with the plurality of dynamics representation vectors, for example, the first dynamics representation vector, the second dynamics representation vector, and the third dynamics representation vector.

In operation 570, the recognition apparatus recognizes the emotion of the user by applying the fused representation vector to a first classifier that classifies different emotions and a second classifier that classifies different expression intensities corresponding to the different emotions, and by estimating the emotion of the user and an expression intensity of the corresponding emotion.

In one example, the recognition apparatus may recognize the emotion of the user by retrieving a characteristic dynamics representation for a respective modality and by retrieving a common fused representation between modalities based on the retrieved characteristic dynamics representations. Thus, the recognition apparatus may recognize the emotion of the user robustly even in an environment in which some modalities have poor input quality, for example, in an environment in which a face is invisible or voice is inaudible.

Figure 6:
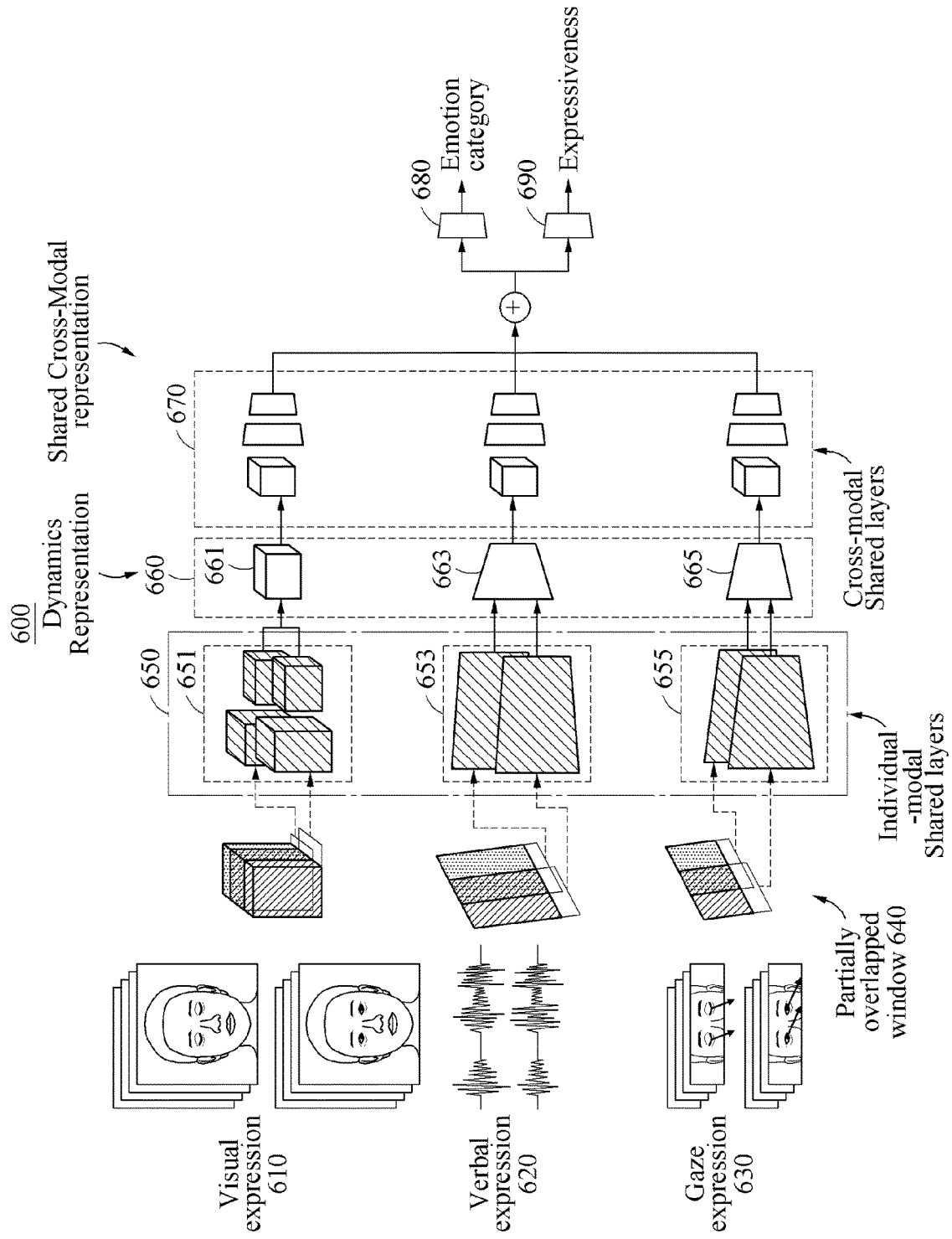
FIG. 6 illustrates an example of a neural network configured to recognize an emotion.

FIG. 6 illustrates an example of a neural network configured to recognize an emotion. Referring to FIG. 6, a recognition apparatus 600 includes first neural networks 650, second neural networks 660, a third neural network 670, a first classifier 680, and a second classifier 690.

The first neural networks 650 include first neural networks 651, 653, and 655 each including layers trained for respective ones of a plurality of modalities. Each of the first neural networks 651, 653, and 655 may extract a plurality of features for a respective modality when implemented with respective input data.

The second neural networks 660 include second neural networks 661, 663, and 665 configured to determine dynamics representation vectors corresponding to the plurality of modalities, respectively.

The third neural network 670 determines a fused representation vector based on the plurality of dynamics representation vectors.

The first classifier 680 classifies or estimates different emotions from the fused representation vector. The second classifier 690 classifies or estimates different expression intensities corresponding to the different emotions from the fused representation vector. The different expression intensities corresponding to the different emotions may be consecutive values, for example, [0, 1], and may be discrete values, for example, {0, 0.1, 0.2, ..., 1}. If the different expression intensities corresponding to the different emotions are consecutive values, classifiers may estimate the different emotions. If the different expression intensities corresponding to the different emotions are discrete values, the classifiers may classify the different emotions.

In detail, the recognition apparatus 600 may acquire the plurality of pieces of data corresponding to the plurality of modalities, for example, a visual expression 610, a verbal expression 620, and a gaze expression 630, using a partially overlapped time window 640.

The recognition apparatus 600 extracts a plurality of features for each modality from the plurality of pieces of data using respective ones of the first neural networks 651, 653, and 655 each including layers trained for a respective modality. The first neural network 651 extracts a plurality of features corresponding to the visual expression 610 including a plurality of frames. The first neural network 653 extracts a plurality of features corresponding to the verbal expression 620. The first neural network 655 extracts a plurality of features corresponding to the gaze expression 630. Each of the first neural networks 651, 653, and 655 may include shared layers for each modality, that is, individual-modal shared layers.

The recognition apparatus 600 determines a dynamics representation vector corresponding to each of the plurality of modalities by applying the features extracted by the first neural networks 650 to the second neural networks 660. Here, each of the dynamics representation vectors may be expressed as, for example, an element-wise distance/or difference.

The second neural network 661 determines a dynamics representation vector corresponding to the visual expression 610 from the output of the first neural network 651. The second neural network 663 determines a dynamics representation vector corresponding to the verbal expression 620 from the output of the first neural network 653. The second neural network 665 determines a dynamics representation vector corresponding to the gaze expression 630 from the output of the first neural network 655. Here, a dynamics representation vector that is an output of each of the second neural network 661, the second neural network 663, and the second neural network 665 may be a vector value corresponding to an emotion and a directivity of the corresponding emotion.

The outputs of the second neural network 661, the second neural network 663, and the second neural network 665 may have the same dimension value. In one example, the first neural networks 650 and the second neural networks 660 may be configured as a single neural network for each modality and may be configured as separate neural networks as shown in FIG. 6.

The recognition apparatus 600 fuses the plurality of dynamics representation vectors using the third neural network 670 that includes shared parameters associated with the plurality of dynamics representation vectors output from the second neural networks 660. The third neural network 670 may include shared layers trained to determine a fused emotion common between the plurality of dynamics representation vectors, that is, cross-modal shared layers. The recognition apparatus 600 determines a single fused representation vector by fusing the plurality of dynamics representation vectors.

The recognition apparatus 600 estimates an emotion of the user by applying the fused representation vector to the first classifier 680 that classifies different emotions. Also, the recognition apparatus 600 estimates an expression intensity of the emotion of the user by applying the fused representation vector to the second classifier 690 that classifies different expression intensities corresponding to the different emotions.

In one example, the number of emotion categories classified for each modality may vary. For example, the number of emotion categories may correspond to various emotions capable of being expressed by the user based on a plurality of modalities, such as neutral, happy, sad, angry, contempt, disgust, fear, surprise, and the like, as a non-limiting example. A method of fusing a plurality of dynamics representation vectors if the number of emotion categories classified for each modality varies will be described with reference to FIGS. 7 and 8.

Figure 7:
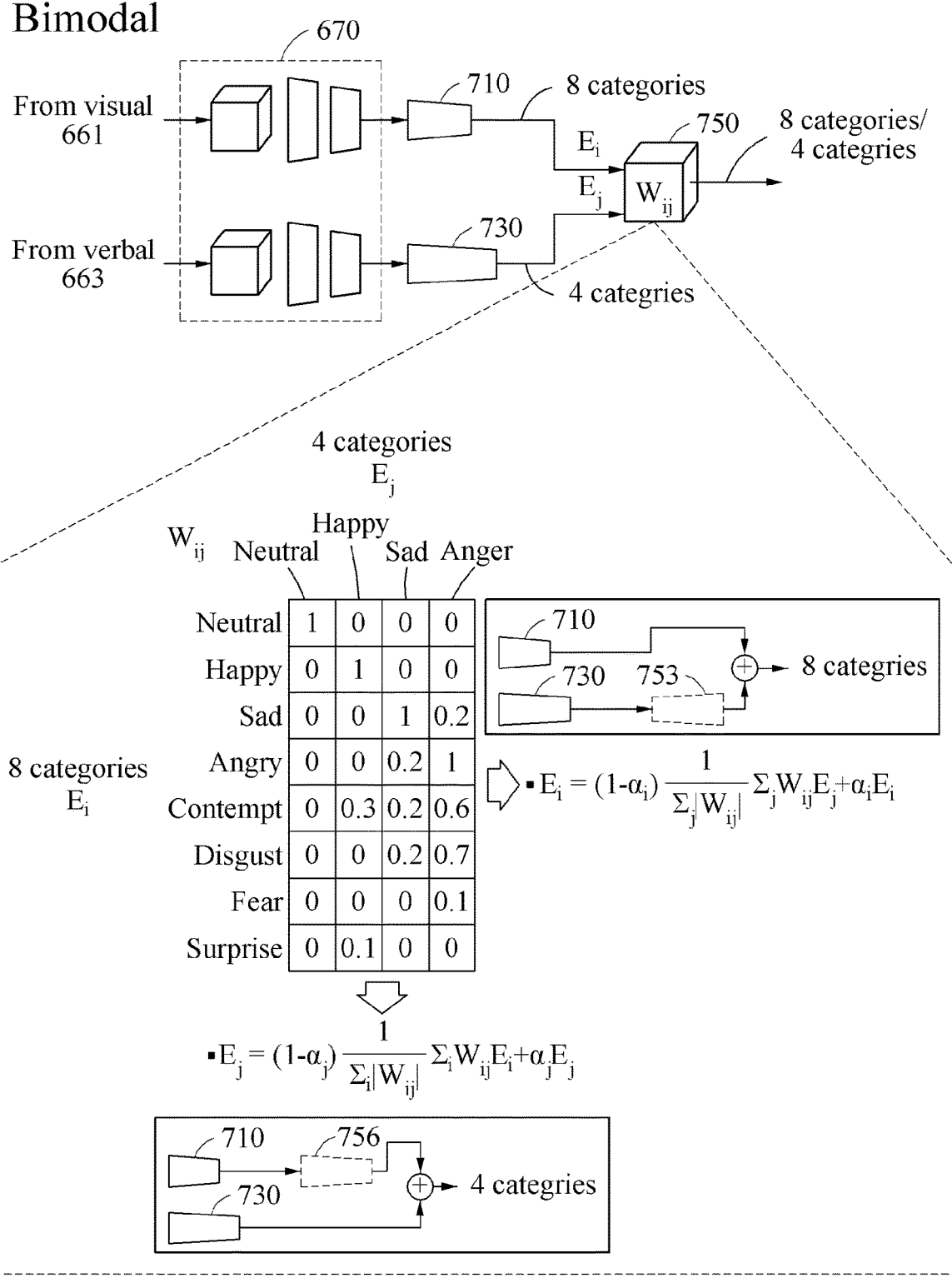
FIG. 7 illustrates an example of a method of fusing a plurality of dynamics representation vectors in response to a plurality of modalities that each have a different number of emotion categories.

FIG. 7 illustrates an example of a method of fusing a plurality of dynamics representation vectors in response to a plurality of modalities that each have a different number of emotion categories. FIG. 7 illustrates an example of a situation in which a dynamics representation vector of the second neural network 661 determined from data in which an emotion is visually expressed and a dynamics representation vector of the second neural network 663 determined from data in which an emotion is verbally expressed are input to the third neural network 670.

In one example, a recognition apparatus 600 recognizes an emotion output through the third neural network 670 through a recognizer 710 and outputs the recognized emotion as eight emotion categories corresponding to a visual expression. Also, the recognition apparatus recognizes the emotion output through the third neural network 670 and outputs the recognized emotion as four emotion categories corresponding to a verbal expression. Here, the number of emotion categories corresponding to the visual expression may be eight emotion categories, for example, neutral, happy, sad, angry, contempt, disgust, fear, and surprise, and the number of emotion categories corresponding to the verbal expression may be four emotion categories, for example, neutral, happy, sad, and angry.

A transformer 753 transforms four emotion categories to eight emotion categories. The transformer 753 approximates or trains the eight emotion categories, for example, according to equation $E_i$ of FIG. 7. In the equation $E_i$, $\alpha_i$ denotes a parameter for a weighted sum of a term corresponding to the four categories and a term corresponding to the eight categories and $W_{ij}$ denotes a pre-trained weight.

A transformer 756 transforms the eight categories to the four categories. The transformer 756 approximates or trains the four categories, for example, according to equation $E_j$ of FIG. 7. In the equation $E_j$, $\alpha_j$ denotes a parameter for a weighted sum of a term corresponding to the four categories and a term corresponding to the eight categories.

When outputs of neural networks have different dimensions, the recognition apparatus may adjust a dimension of an emotion category corresponding to each modality based on the pre-trained weight $W_{ij}$ as shown in the illustrated table included in the recognizer 750.

FIG. 8 illustrates an example of a method of fusing a plurality of dynamics representation vectors in response to three modalities that each have a different number of emotion categories. Referring to FIG. 8, although an emotion category of each of three modalities has a different dimension, a recognition apparatus 800 may adjust a dimension of an emotion category corresponding to each modality using a table including a pre-trained weight, in the same manner as that of FIG. 7.

Figure 9:
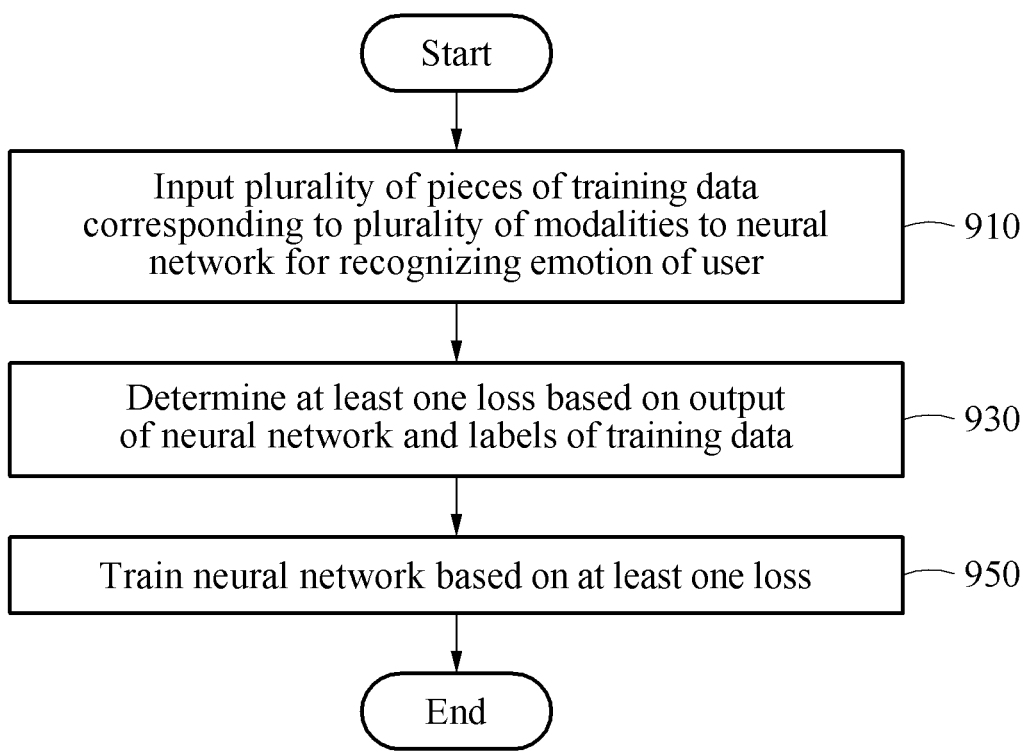
FIG. 9 is a flowchart illustrating an example of a training method for machine learning emotion recognition.

FIG. 9 is a flowchart illustrating an example of a training method for machine learning emotion recognition. Referring to FIG. 9, in operation 910, a training apparatus (hereinafter, also referred to as a training apparatus) for emotion recognition inputs a plurality of pieces of training data corresponding to a plurality of modalities to an initial neural network for recognizing an emotion of a user. The plurality of pieces of training data may include different emotions for each of the plurality of modalities and a plurality of inputs corresponding to expression intensities of the different emotions. The neural network may include neural networks that determine a plurality of dynamics representation vectors corresponding to the plurality of modalities and a neural network that determines a fused representation vector based on the plurality of dynamics representation vectors. Each of the neural networks that determine dynamics representation vectors may include layers in which different emotions corresponding to each of the modalities and different expression intensities corresponding to the different emotions are trained for such objectives using the training data. The neural network that determines the fused representation vector may include shared parameters associated with the dynamics representation vectors. The shared parameters may be updated and/or changed in response to a change in each of the dynamics representation vectors.

In operation 930, the training apparatus determines at least one loss based on an output of the neural network and labels of the training data. An example of a method of determining, by the training apparatus, at least one loss will be described with reference to FIG. 10.

In operation 950, the training apparatus trains the neural network based on the at least one loss.

Figure 10:
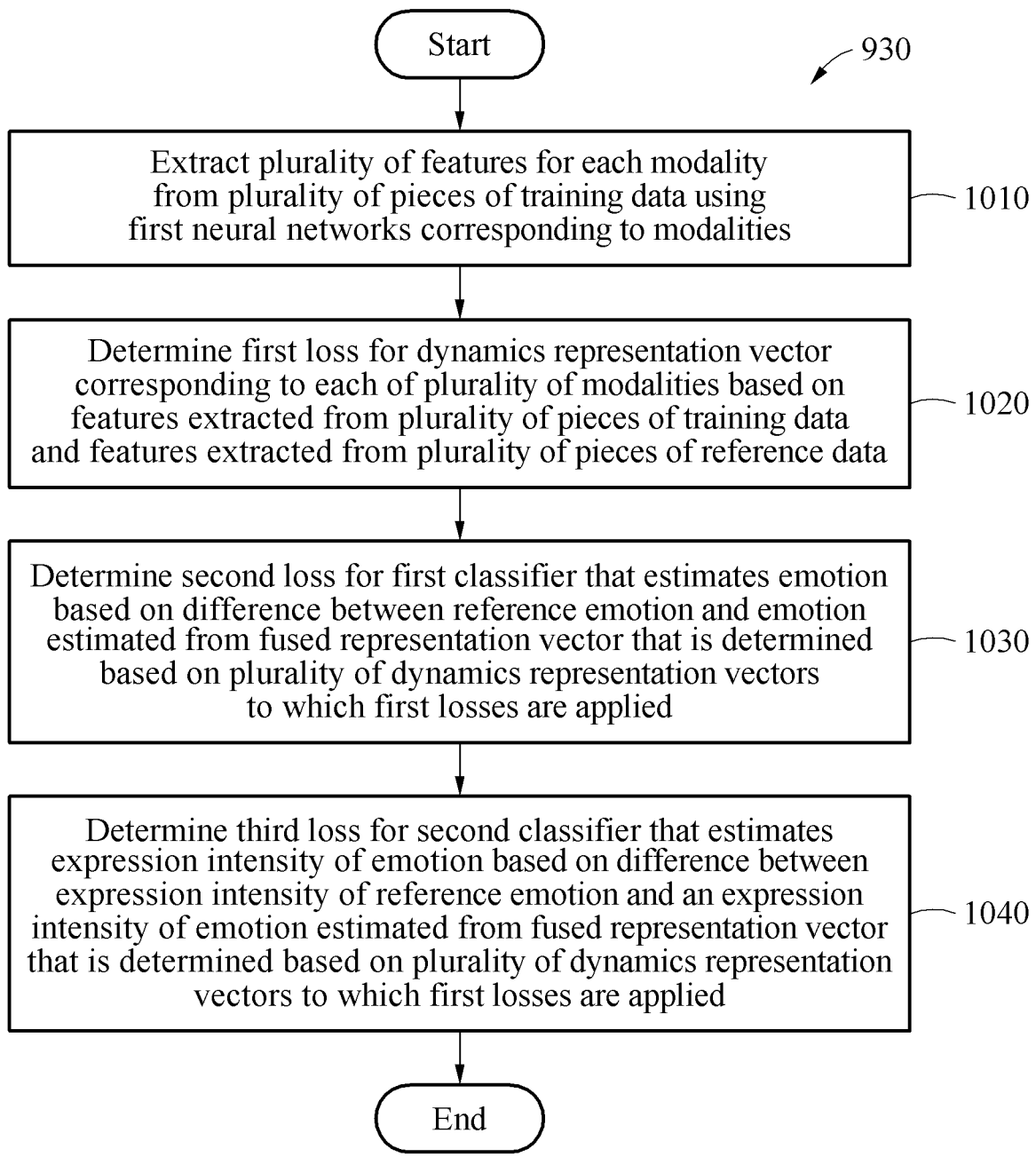
FIG. 10 is a flowchart illustrating an example of a method of determining a loss in the training of FIG. 9.

FIG. 10 is a flowchart illustrating an example of a method of determining a loss in the training of FIG. 9. Referring to FIG. 10, in operation 1010, the training apparatus extracts a plurality of features for each modality from a plurality of pieces of training data using first neural networks corresponding to modalities.

In operation 1020, the training apparatus determines a first loss for a dynamics representation vector corresponding to each of the plurality of modalities based on the features extracted from the plurality of pieces of training data and features extracted from a plurality of pieces of reference data. For example, the training apparatus may estimate a dynamics representation vector based on a variation between the features extracted from the training data and the features extracted from the reference data. The training apparatus may acquire a dynamics representation vector that is to be actually estimated based on labels of the training data. Loss may be a measure of how far a model's predictions are from its label, for example. The training apparatus may determine the first loss for the dynamics representation vector corresponding to each of the plurality of modalities based on a difference between the estimated dynamics representation vector and the dynamics representation vector that is to be actually estimated.

In operation 1030, the training apparatus determines a second loss for a first classifier that estimates an emotion based on a difference between a reference emotion and an emotion estimated from the fused representation vector that is determined based on the plurality of dynamics representation vectors to which the first losses are applied. For example, the training apparatus may acquire an emotion that is to be actually estimated from labels of training data and may determine the second loss based on a difference between the estimated emotion and the emotion that is to be actually estimated.

In operation 1040, the training apparatus determines a third loss for a second classifier that estimates an intensity of the emotion based on a difference between an intensity of the reference emotion and an intensity of the emotion estimated from the fused representation vector that is determined based on the plurality of dynamics representation vectors to which the first losses are applied. For example, the training apparatus may acquire the intensity of emotion that is to be actually estimated from the labels of the training data and may determine the third loss based on a difference between the estimated intensity of the emotion and the intensity of the emotion that is to be actually estimated.

Figure 11:
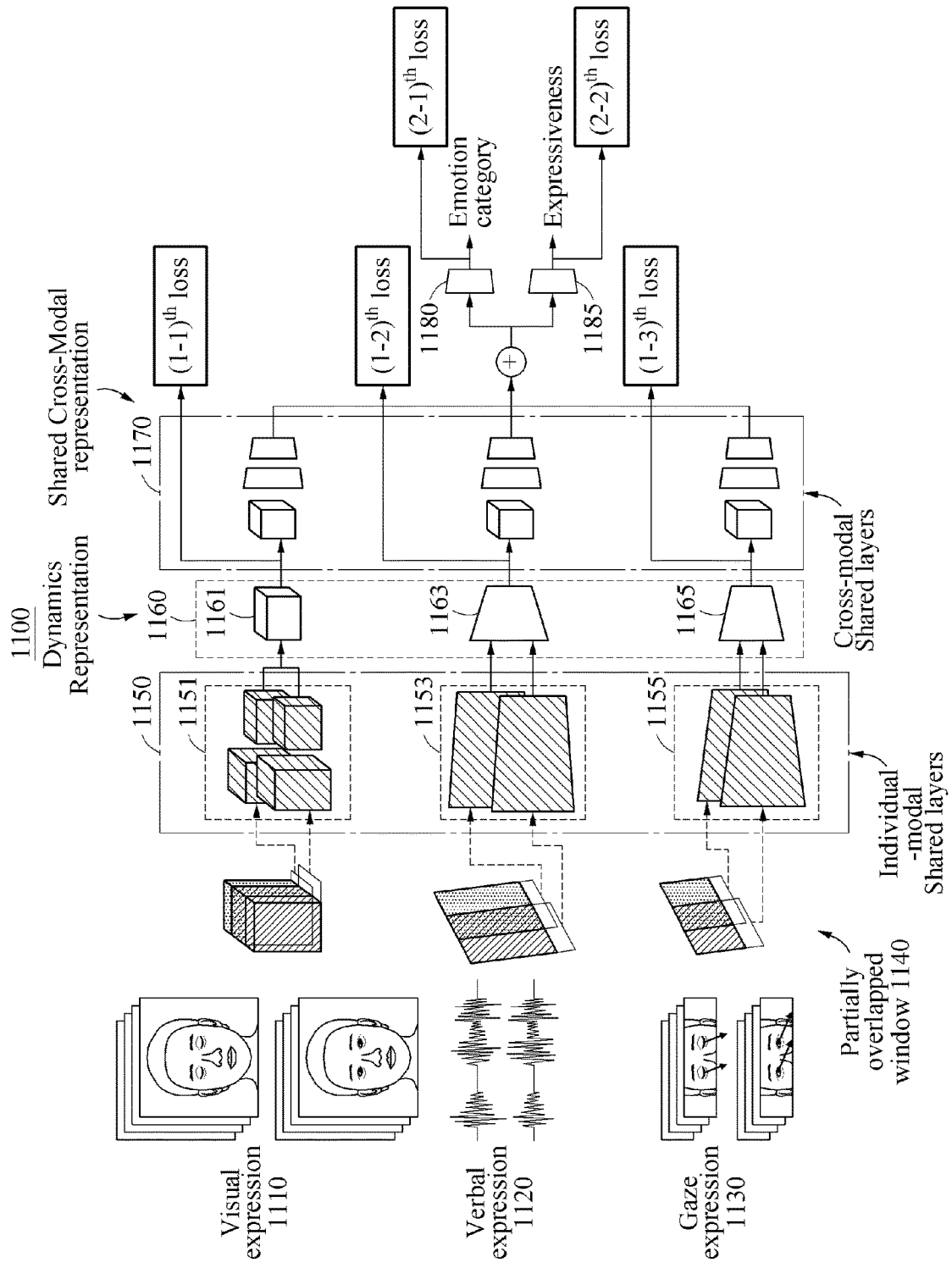
FIG. 11 illustrates an example of a neural network used for training of emotion recognition.

FIG. 11 illustrates an example of a neural network used for training of emotion recognition. Referring to FIG. 11, a training apparatus 1100 used for training of the emotion recognition includes first neural networks 1150, second neural networks 1160, a third neural network 1170, a first classifier 1180, and a second classifier 1185.

The first neural networks 1150 include first neural networks 1151, 1153, and 1155 each including layers trained for respective ones of a plurality of modalities. Each of the first neural networks 1151, 1153, and 1155 may extract a plurality of features for a respective modality.

The second neural networks 1160 include second neural networks 1161, 1163, and 1165 configured to determine a plurality of dynamics representation vectors corresponding to the plurality of modalities, respectively.

The third neural network 1170 determines a fused representation vector based on the plurality of dynamics representation vectors.

The first classifier 1180 classifies different emotions from the fused representation vector. The second classifier 1185 classifies different expression intensities corresponding to the different emotions from the fused representation vector.

The training apparatus 1100 may acquire the plurality of pieces of training data corresponding to the plurality of modalities, for example, a visual expression 1110, a verbal expression 1120, and a gaze expression 1130, using a partially overlapped time window 1140. Here, the plurality of pieces of training data may include different emotions for each of the plurality of modalities and a plurality of inputs corresponding to expression intensities of the different emotions.

The training apparatus 1100 extracts a plurality of features for each modality from the plurality of pieces of training data using respective ones of the first neural networks 1151, 1153, and 1155 each including layers trained for a respective modality. The first neural network 1151 extracts a plurality of features from training data corresponding to the visual expression 1110. The first neural network 1153 extracts a plurality of features from training data corresponding to the verbal expression 1120. Also, the first neural network 1155 extracts a plurality of features from training data corresponding to the gaze expression 1130. Each of the first neural networks 1151, 1153, and 1155 may include shared layers for a respective modality, that is, individual modal shared layers. The training apparatus 1100 determines a dynamics representation vector corresponding to each of the plurality of modalities by applying the features extracted by the first neural networks 1150 to the second neural networks 1160.

The second neural network 1161 determines a dynamics representation vector corresponding to the visual expression 1110 from the output of the first neural network 1151. The second neural network 1163 determines a dynamics representation vector corresponding to the verbal expression 1120 from the output of the first neural network 1153. The second neural network 1165 determines a dynamics representation vector corresponding to the gaze expression 1130 from the output of the first neural network 1155. In one example, the first neural networks 1150 and the second neural networks 1160 may be configured as a single neural network and may be configured as separate neural networks as shown in FIG. 11.

The training apparatus 1100 may determine a loss, for example, a first loss, for a dynamics representation vector corresponding to each of the plurality of modalities based on features extracted from a plurality of pieces of training data and features extracted from a plurality of pieces of reference data.

The training apparatus 1100 may further include a recognizer configured to transform a dynamics representation vector corresponding to each of the plurality of modalities to an actual known value, for example, reference data such as ground truth. The actual value may be expressed as, for example, an emotion and a directivity such as "sad" −0.2 and "happy" +0.8.

The training apparatus 100 trains dynamics representation vectors corresponding to the plurality of modalities, respectively, to be close to actual values by back-propagating the first losses using the second neural networks 1160. In detail, the training apparatus 1100 trains the dynamics representation vector corresponding to the visual expression 1110 to be close to an actual value by back-propagating a $(1-1)^{th}$ loss to the second neural network 1161. The training apparatus 1100 trains the dynamics representation vector corresponding to the verbal expression 1120 to be close to an actual value by back-propagating a $(1-2)^{th}$ loss to the second neural network 1163. Here, the $(1-1)^{th}$ loss and the $(1-2)^{th}$ loss may correspond to, for example, an L2-norm loss about dynamics representation.

The training apparatus 1100 trains the dynamics representation vector corresponding to the gaze expression 1130 to be close to an actual value by back-propagating a $(1-3)^{th}$ loss to the second neural network 1165. Here, the $(1-3)^{th}$ loss may be, for example, an L2-norm loss about dynamics representation and an L2-norm loss about eye positions.

The training apparatus 1100 fuses the plurality of dynamics representation vectors using the third neural network 1170 that includes shared parameters associated with the plurality of dynamics representation vectors output from the second neural networks 1160. The third neural network 1170 may include shared layers trained to determine a fused emotion common between the plurality of dynamics representation vectors, that is, cross-modal shared layers. The training apparatus 1100 determines a single fused representation vector by fusing the plurality of dynamics representation vectors.

The training apparatus 1100 estimates an emotion of the user by applying the fused representation vector to the first classifier 1180 that classifies different emotions. Here, the training apparatus 1100 may determine a loss, for example, the $(2-1)^{th}$ loss, for the first classifier 1180 based on a difference between a reference emotion and an emotion estimated from the fused representation vector that is determined based on the plurality of dynamics representation vectors to which the first losses are applied. The training apparatus 1100 trains the fused representation vector to be close to an actual emotion by back-propagating the $(2-1)^{th}$ loss to the first classifier 1180. Here, the $(2-1)^{th}$ loss may be, for example, a cross entropy loss about an emotion category.

The training apparatus 1100 estimates an expression intensity of the emotion of the user by applying the fused representation vector to the second classifier 1185 that classifies different expression intensities corresponding to the different emotions. The training apparatus 1100 may determine a loss, for example, a $(2-2)^{th}$ loss, for the second classifier 1185 that estimates an expression intensity of the emotion based on an expression intensity of the reference emotion and an expression intensity of the emotion estimated from the fused representation vector that is determined based on the plurality of dynamics representation vectors to which the first losses are applied. The training apparatus 1100 trains the fused representation vector to be close to an actual intensity of the emotion by back-propagating the $(2-2)^{th}$ loss to the second classifier 1185. For example, if an output of the second classifier 1185 is discrete, the $(2-2)^{th}$ loss may be a cross-entropy loss about an expression intensity of the emotion. Also, if the output of the second classifier 1185 is continuous, the $(2-2)^{th}$ loss may be an L2-norm loss about the expression intensity of the emotion or a mean squared error (MSE) loss. Although the output of the second classifier 1185 is continuous, the cross entropy loss may be used using an additional operation, for example, a mean calculation.

Figure 12:
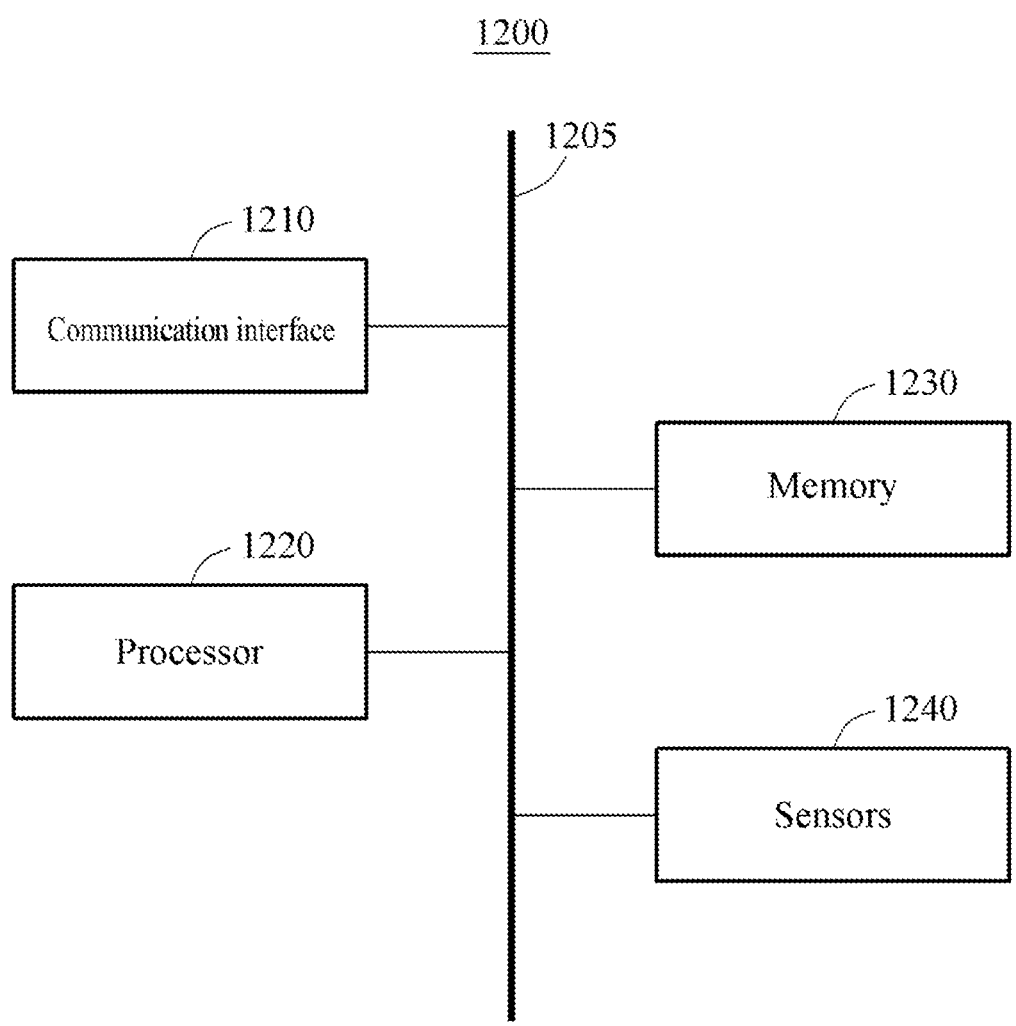
FIG. 12 is a block diagram illustrating an example of an apparatus with emotion recognition.

FIG. 12 is a block diagram illustrating an example of an apparatus for recognizing an emotion. Referring to FIG. 12, an apparatus 1200 (also, referred to as a recognition apparatus) for recognizing an emotion includes a communication interface 1210 and a processor 1220. The recognition apparatus 1200 further includes a memory 1230 and sensors 1240. The communication interface 1210, the processor 1220, the memory 1230, and the sensors 1240 communicate with one another through a communication bus 1205.

The communication interface 1210 acquires a plurality of pieces of data corresponding to a plurality of modalities. Here, the plurality of pieces of data includes a plurality of inputs for each modality.

The processor 1220 extracts a plurality of features for each modality from the plurality of pieces of data. The processor 1220 determines a dynamics representation vector corresponding to each of the plurality of modalities based on the plurality of features for each modality. The processor 1220 determines a fused representation vector based on the plurality of dynamics representation vectors corresponding to the plurality of modalities. The processor 1220 recognizes an emotion of a user based on the fused representation vector. In addition, the processor 1220 may perform any one, any combination, or all apparatuses or methods described above with reference to FIGS. 1 through 11.

The memory 1230 stores non-transitory computer-readable instructions. In response to the instructions stored in the memory 1230 being executed at the processor 1220, the processor 1220 may implement the aforementioned operations associated with emotion recognition. The memory 1230 may also store the plurality of pieces of data corresponding to each of the plurality of modalities, the dynamics representation vectors, and the fused representation vector. The memory 1230 may further store the emotion of the user recognized by the processor 1220. The memory 1230 may store parameters associated with a plurality of classifiers and a plurality of neural networks.

The sensors 1240 may include any one or any combination of an image sensor, a proximity sensor, and an infrared (IR) sensor for capturing an input image, and at least one voice sensor configured to record a voice uttered by the user. The sensors 1240 capture an input image using a known scheme, for example, a scheme of transforming an optical image to an electrical signal. The sensors 1240 may transfer any one or any combination of a captured color image, depth image, and an IR image to at least one of the processor 1220 and the memory 1230.

The processor 1220 executes additional instructions or programs, or controls the recognition apparatus 1200. The recognition apparatus 1200 connects to an external device, for example, a PC or a network, through an I/O device (not shown) and exchanges data. The recognition apparatus 1200 may be configured as at least a portion of a mobile device such as a mobile phone, a smartphone, a personal digital assistant (PDA), a tablet computer, and a laptop computer, a computing device such as a PC and a netbook, or an electronic device such as a TV and a smart TV. In addition, the aforementioned description may be applicable to the recognition apparatus 1200 and a further description related thereto is omitted here.

The recognition apparatus 600 and 1200, a communication interface 1210, a processor 1220, a memory 1230, sensors 1240, the training apparatus 1100, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented emotion recognition method, the method comprising:
    acquiring a plurality of pieces of data corresponding to a plurality of modalities, the plurality of pieces of data corresponding to a plurality of inputs for each modality;
    extracting a plurality of features for each modality from the plurality of pieces of data;
    determining a dynamics representation vector corresponding to variations of a user's emotion expressed in each of the plurality of modalities based on the plurality of features for each modality, wherein the variations of the user's emotion comprises the emotion, a directivity of the emotion, and a magnitude of the emotion;
    determining a fused representation vector based on the plurality of dynamics representation vectors corresponding to the plurality of modalities based on a result of summing the directivity of the emotion and the magnitude of the emotion for each the plurality of modalities; and
    recognizing the emotion of the user based on the fused representation vector, wherein the recognizing comprises:
    estimating the emotion of the user by applying the fused representation vector to a first classifier configured to classify different emotions; and
    estimating an expression intensity of the emotion of the user by applying the fused representation vector to a second classifier configured to classify different expression intensities corresponding to the different emotions.

2. The method of claim 1, wherein the plurality of modalities comprises any one or any combination of any two or more of a facial expression, a gesture, a voice, and a gaze.

3. The method of claim 1, wherein the acquiring comprises acquiring a first input corresponding to a first time duration and a second input corresponding to a second time duration for each modality.

4. The method of claim 3, wherein the first time duration and the second time duration partially overlap or are continuous.

5. The method of claim 1, wherein the extracting comprises extracting the plurality of features for each modality from the plurality of pieces of data using a respective one of first neural networks each comprising one or more layers trained for a respective modality.

6. The method of claim 5, wherein each of the one or more layers is configured to extract different expression intensities corresponding to the emotion of the respective modality.

7. The method of claim 1, wherein the acquiring comprises a first input corresponding to a first time duration and a second input corresponding to a second time duration, and
    the determining of the dynamics representation vector comprises determining the dynamics representation vector corresponding to each of the plurality of modalities by applying features corresponding to the first input and the second input to a second neural network.

8. The method of claim 1, wherein the determining of the fused representation vector comprises determining the fused representation vector by fusing the plurality of dynamics representation vectors.

9. The method of claim 8, wherein the determining of the fused representation vector comprises fusing the plurality of dynamics representation vectors using a third neural network comprising shared parameters associated with the plurality of dynamics representation vectors.

10. The method of claim 9, wherein the shared parameters are changed in response to a change in each of the plurality of dynamics representation vectors.

11. A non-transitory computer-readable recording an instruction that, when executed by a processor, causes the processor to perform the method of claim 1.

12. The method of claim 1, wherein the emotion of the user is recognized by estimating the user's emotion and expressiveness of the emotion based on the fused representation vector.

13. A training method for emotion recognition, the method comprising:
    inputting a plurality of pieces of training data corresponding to a plurality of modalities to a neural network for recognizing emotions of a user, the neural network comprising:
    a plurality of neural network portions for determining a plurality of dynamics representation vectors corresponding to the plurality of modalities; and
    a fused neural network portion for determining a fused representation vector based on the plurality of dynamics representation vectors corresponding to variations of a user's emotion expressed in each of the plurality of modalities based on a result of summing the directivity of the emotion and the magnitude of the emotion for each the plurality of modalities,
wherein the variations of the user's emotion comprises the emotion, a directivity of the emotion, and a magnitude of the emotion;
determining at least one loss based on an output of the neural network and labels of the training data; and
training the neural network including the plurality of neural network portions and the fused neural network portion based on the at least one loss,
wherein the determining of the at least one loss comprises:
determining a first loss for a dynamics representation vector corresponding to each of the plurality of modalities;
determining a second loss for a first classifier for estimating the emotions; and
determining a third loss for a second classifier for estimating an expression intensity of the emotions.

14. The method of claim 13, wherein the determining of the at least one loss comprises:
extracting a plurality of features for each modality from the plurality of pieces of the training data;
determining the first loss for the dynamics representation vector corresponding to each of the plurality of modalities based on the features extracted from the plurality of pieces of the training data and features extracted from a plurality of pieces of reference data;
determining the second loss for the first classifier for estimating the emotions based on respective differences between reference emotions and the emotions estimated from the fused representation vector that are determined based on the plurality of dynamics representation vectors to which the first losses are applied; and
determining the third loss for the second classifier for estimating the expression intensity of the emotions based on respective differences between expression intensities of the reference emotions and expression intensities of the emotions estimated from the fused representation vector that are determined based on the plurality of dynamics representation vectors to which the first losses are applied.

15. The method of claim 14, wherein the determining of the first loss comprises determining the first loss for the dynamics representation vector corresponding to each of the plurality of modalities based on a variation between the features extracted from the plurality of pieces of training data and the features extracted from the plurality of pieces of reference data.

16. The method of claim 13, wherein each of the plurality of the neural networks for determining the dynamics representation vectors comprises layers in which different emotions corresponding to the plurality of modalities and different expression intensities corresponding to the different motions are trained.

17. The method of claim 13, wherein the fused neural network portion for determining the fused representation vector comprises shared parameters associated with the dynamics representation vectors, and
the shared parameters are changed in response to a change in each of the plurality of dynamics representation vectors.

18. The method of claim 13, wherein the plurality of pieces of data comprises a plurality of inputs corresponding to different emotions for each modality and expression emotions of the different emotions.

19. The method of claim 13, wherein the plurality of modalities comprises any one or any combination of any two or more of a facial expression, a gesture, a voice, and a gaze.

20. An apparatus for recognizing an emotion, the apparatus comprising:
a communication interface configured to acquire a plurality of pieces of data corresponding to a plurality of modalities, the plurality of pieces of data comprising a plurality of inputs for each modality; and
a processor configured to:
extract a plurality of features for each modality from the plurality of pieces of data,
determine a dynamics representation vector corresponding to variations of a user's emotion expressed in each of the plurality of modalities based on the plurality of features for each modality, wherein the variations of the user's emotion comprises the emotion, a directivity of the emotion, and a magnitude of the emotion,
determine a fused representation vector based on the plurality of dynamics representation vectors corresponding to the plurality of modalities based on a result of summing the directivity of the emotion and the magnitude of the emotion for each the plurality of modalities, and
recognize an emotion of a user based on the fused representation vector,
wherein, for the recognizing, the processor is configured to:
estimate the emotion of the user by applying the fused representation vector to a first classifier configured to classify different emotions; and
estimate an expression intensity of the emotion of the user by applying the fused representation vector to a second classifier configured to classify different expression intensities corresponding to the different emotions.

21. The apparatus of claim 20, wherein the plurality of modalities comprises any one or any combination of any two or more of a facial expression, a gesture, a voice, and a gaze.

22. The apparatus of claim 20, wherein the plurality of pieces of data comprises a first input corresponding to a first time duration and a second input corresponding to a second time duration.

23. The apparatus of claim 22, wherein the first time duration and the second time duration partially overlap.

24. The apparatus of claim 20, wherein, for the extracting of the plurality of features, the processor is further configured to extract the plurality of features for each modality from the plurality of pieces of data using a respective one of first neural networks each comprising layers trained for a respective modality.

25. The apparatus of claim 20, wherein, for the determining of the dynamics representation vector, the processor is further configured to determine the dynamics representation vector corresponding to each of the plurality of modalities by applying features corresponding to the first input and the second input to a second neural network.

26. The apparatus of claim 25, wherein, for the determining of the fused representation vector, the processor is further configured to fuse the plurality of dynamics representation vectors using a third neural network comprising shared parameters associated with the plurality of dynamics representation vectors.

27. A processor implemented emotion recognition method, the method comprising:

extracting respective features for each of different modalities from respectively captured data over a duration of time;

determining a dynamics representation vector corresponding to variations of a user's emotion expressed in each of the different modalities based on the respective features, wherein the variations of the user's emotion comprises the emotion, a directivity of the emotion, and a magnitude of the emotion;

determining a fused representation vector based on each of the determined dynamics representation vectors based on a result of summing the directivity of the emotion and the magnitude of the emotion for each the plurality of modalities; and recognizing the emotion of a user based on the fused representation vector, wherein the recognizing comprises:

estimating the emotion of the user by applying the fused representation vector to a first classifier configured to classify different emotions; and estimating an expression intensity of the emotion of the user by applying the fused representation vector to a second classifier configured to classify different expression intensities corresponding to the different emotions.

28. The method of claim 27, wherein the plurality of modalities comprises any one or any combination of any two or more of a facial expression, a gesture, a voice, and a gaze.

29. The method of claim 27, further acquiring a first input corresponding to a first time duration and a second input corresponding to a second time duration for each modality as the respectively captured data.

30. The method of claim 29, wherein the first input corresponds to a reference value, and the second input corresponds to a current time value.

31. The method of claim 29, wherein the dynamics representation vector is based on a difference between a feature vector of the first input corresponding to a previous emotion expression and a feature vector of a second input corresponding to a current emotion expression.

32. The method of claim 29, wherein the dynamics representation vector is based on concatenating the feature vector of the first input and the feature vector of the second input.

* * * * *